United States Patent [19]

St. Onge et al.

[11] Patent Number: 5,794,662

[45] Date of Patent: Aug. 18, 1998

[54] PIPE LINER AND METHOD OF INSTALLATION

[76] Inventors: Henri S. St. Onge; Bryan St. Onge, both of 226 Catalina Drive, West Hill, Ontario, Canada, M1E 1B7

[21] Appl. No.: 695,999

[22] Filed: Aug. 15, 1996

[51] Int. Cl.[6] ............................................. F16L 55/16
[52] U.S. Cl. ........................... 138/97; 138/98; 156/287; 264/516; 264/269
[58] Field of Search ........................... 138/98, 97, 155; 264/36, 512, 516, 269, 265; 156/287, 94

[56] References Cited

U.S. PATENT DOCUMENTS

| | | | |
|---|---|---|---|
| 4,386,629 | 6/1983 | Cook et al. | 138/98 X |
| 4,496,499 | 1/1985 | Brittain et al. | 264/36 |
| 4,647,256 | 3/1987 | Hahn et al. | 138/98 X |
| 4,796,699 | 1/1989 | St. Onge | 138/97 |
| 4,930,542 | 6/1990 | Winkle et al. | 138/98 |
| 5,372,162 | 12/1994 | Frey | 138/98 |
| 5,499,660 | 3/1996 | StorgArd | 138/98 |

FOREIGN PATENT DOCUMENTS

| | | |
|---|---|---|
| 1164816 | 4/1984 | Canada. |
| 3129870 | 2/1983 | Germany. |
| 9100111 | 1/1992 | Netherlands. |
| 8800138 | 9/1988 | Sweden. |

OTHER PUBLICATIONS

Database WPI, Section Ch, Week 9630, Derwent Publications Ltd., London, GB (Taki–N) Takiron KK—21 May 1996, pp. 01. /02/02.

Primary Examiner—Patrick F. Brinson

[57] ABSTRACT

A method of relining sewer lines, waterlines or gas lines is disclosed which uses a segmented liner of reduced size relative to the pipe being relined, with the liner being heat/pressure molded to the shape of the pipe being relined. The liner segments are joined by conventional joining techniques, however, the preferred joint is achieved by fusion.

10 Claims, 3 Drawing Sheets

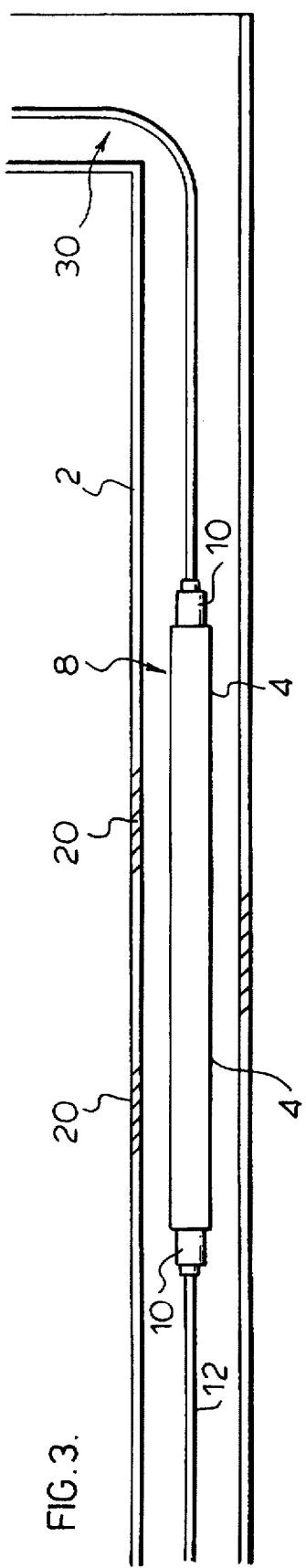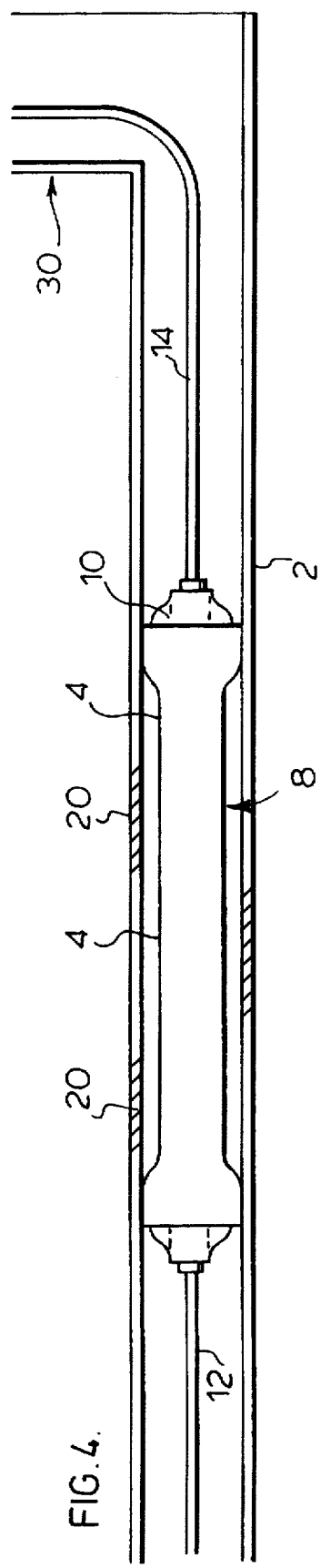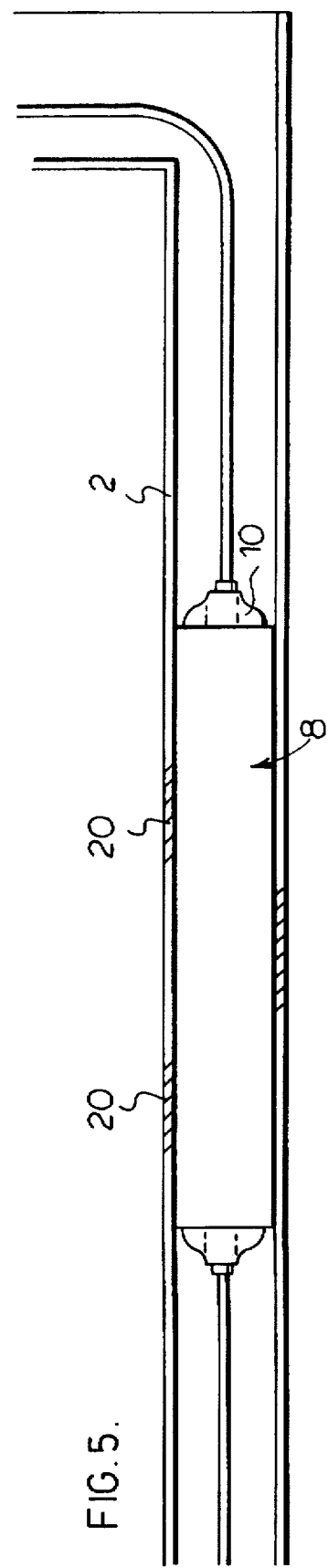

PIPE LINER AND METHOD OF INSTALLATION

FIELD OF THE INVENTION

The present invention is directed to procedures for repairing or relining of pipelines, and in particular relining of sewer lines, water mains, gas lines and manholes.

BACKGROUND OF THE INVENTION

There continues to be considerable interest in systems for relining of sewer lines, which systems do not require extensive digging to allow a liner to be inserted in the sewer line. It is known to use continuous lengths of PVC or polyethylene pipe that are extruded and shortly after extrusion they are deformed into a generally 'U' shape. This flattened pipe is then coiled and easily transported to the installation site. It is installed by dragging the liner in its flattened condition through the existing pipe, whereafter the liner is plugged at either end and exposed to heat and pressure to force the deformed liner to return to its original circular shape. In some cases, it is then necessary to grout between the liner and the original sewer to maintain the liner in place. Note that these systems merely return the liner to its original extruded shape and do not use the original pipe as a mold for controlling expansion of the liner. One of the prime advantages of the deformed liner system is that the liner is of a continuous length and has no interruptions along the length thereof and once inserted in a reduced volume configuration, is returned to its extruded shape.

Although these "no-dig" systems have enjoyed some success, they can be difficult to install and the deformed liner, particularly in large diameters, is somewhat difficult to handle. With cooler temperatures, the liner becomes stiff and in some cases, it is necessary to preheat the liner to add flexibility for handling of the liner. Furthermore, the insertion can be difficult, even in the deformed shape.

SUMMARY OF THE INVENTION

The present invention recognizes that certain thermoplastic pipe, in particular PVC pipe, when heated and exposed to pressure, can be expanded and molded against the inside of an existing pipe to effect relining thereof. Furthermore, the present invention has found that it is possible to have joints between pipe segments and subject the joined pipes to the required heat and pressure with the resultant combination expanded and molded against the existing pipe to be relined with the integrity of the joints being maintained. The pipe segments can be of traditional sections, easily installed due to the reduced diameter and merely appropriately sized once properly located.

The present invention further recognizes that, in many cases, it is not necessary to reline an entire length of pipe, as the pipe may only be damaged in a certain limited segment. With the present invention, it is possible to line only that portion which is damaged or a certain limited portion to effectively provide a spot repair along a length of pipe.

With the present invention, it is possible to have limited access to the existing pipe and insert smaller diameter liners into the pipe and form fusion joints, solvent joints or other joints to the pipe segments as they are being inserted into the existing pipe. The diameter of the liner can be significantly less than the diameter of the pipe being relined whereby the liner is easily inserted in the pipe. Once the length of pipe liner has been inserted in the existing pipe, the liner can be plugged at either end and exposed to steam under pressure to heat the liner along the length thereof and apply pressure thereby urging it to expand and contact the interior walls of the surrounding existing pipe. After the liner has fully expanded to conform to the interior surface of the existing pipe, it can be cooled and then the plugs removed. The resulting liner conforms to the walls of the existing pipe and it has been found that the joints formed between the pipe segments also expand and do not exhibit any problems due to the expansion thereof within the pipe.

With the present method and system, it is possible to use short pipe segments, form suitable fusion, solvent or other joints between segments and insert the joint segments along a length of pipe. Once the appropriate length has been inserted in the pipe, it is then possible to effectively expand and mold the liner to conform to the interior of an existing pipe. This method can be used whenever there is suitable access to a pipeline.

BRIEF DESCRIPTION OF THE DRAWINGS

Preferred embodiments of the invention are shown in the drawings, wherein:

FIG. 3 is a schematic view showing repair of a portion of a pipe liner with the smaller diameter pipe liner loosely located in the area of the repair;

FIG. 4 is a schematic view similar to FIG. 3 where the pipe liner has started to undergo expansion;

FIG. 5 shows the pipe liner expanded and conforming to the walls of the damaged pipeline;

DETAILED DESCRIPTION OF THE PREFERRED EMBODIMENTS

Figure 1:
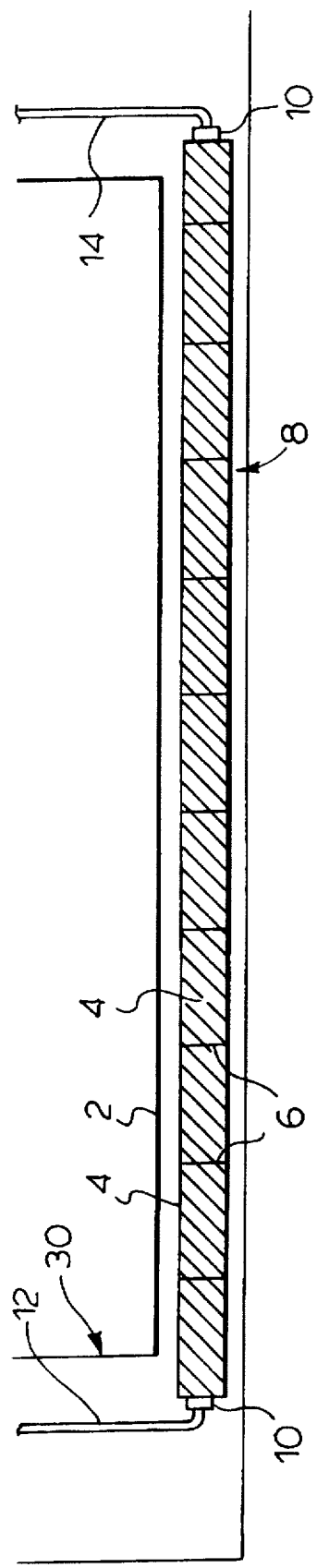
FIG. 1 is a schematic view showing a number of joined pipe segments inserted into an existing pipeline between two manholes.

The method and apparatus is shown in the figures where an existing sewer pipe or pipeline 2 is being relined with short pipe segments 4 joined with fusion joints 6, resulting in a joined pipe liner 8. The method and apparatus will be described with respect to a sewer pipe to be relined, however, any pipeline, manhole or elongate conduit can be relined using this technique.

In contrast to existing technology, the pipe liner 8 is made up of joined pipe segments 4 and can have a host of joints 6. Furthermore, the pipe liner 8 is inserted as a conventional pipe (i.e. generally circular in cross section) can have a significantly reduced diameter relative to the diameter of the existing sewer. For example, if the existing sewer was an 8 inch sewer, the short pipe segments could be of a six inch diameter. This allows easy insertion of the liner while still being within a reasonable expansion range for the liner. The liner before expansion should be sized to allow easy insertion while keeping the necessary expansion to a minimum.

One of the advantages of forming the pipe liner by means of short pipe segments 4 is that it can be connected at the base of a manhole such that a dug trench is not necessary. The system is also used where a dug trench is used to provide full access to an end of a sewer line and longer lengths of pipe segments can be used. The pipe segments can be joined using existing thermal or solvent technology. No coiling of pipe is required for insertion, as joints are easily made.

Once the pipe liner 8 is in place (merely by pushing or pulling it through the existing sewer, which is easily accomplished due to the reduced diameter of the liner relative to the existing sewer), inflatable plugs 10 are inserted either end. These inflatable plugs or bulk heads essentially close the pipe liner and allow the pressurizing of the pipe liner by introducing steam, hot fluids or any other suitable media into the pipe liner. The pipe liner becomes hotter and starts to expand, and the liner is forced into contact with the existing sewer. Any irregularities in the sewer merely limit the molding process somewhat sooner or slightly later. It has been found that the pipe liner can easily be expanded to the diameter of the existing sewer, and thus, provides a snug fit with the interior walls of the existing sewer. After the heat/pressure molding process, the plugs can be removed from the pipe. As can be appreciated, the inflatable plugs 10 have an inlet line 12 associated at one end and an exhaust 14 at the other end. Typically, steam under pressure is introduced into the pipe liner and after the liner has expanded to contact the interior walls of the existing sewer, cooling fluids can be introduced to effectively set the liner. It can be appreciated that the sewer or conduit could be noncircular in cross section, as the liner will expand until limited by the interior walls thereof.

It has been found that the joints expand much in the manner of the pipe segments and no problems are experienced in these areas.

For pressure applications, such as water lines, fusion or solvent joints are preferred. For gravity lines, such as sewers, mechanical joints are satisfactory. Additional care with mechanical joints may be required to maintain quality. In some cases, the expanding agent, such as hot steam, is introduced into a fabric sleeve to uniformly heat and expand the connected pipe segments. When the pipe segments have thread type fasteners, solvent cement may also be used.

Figure 2:
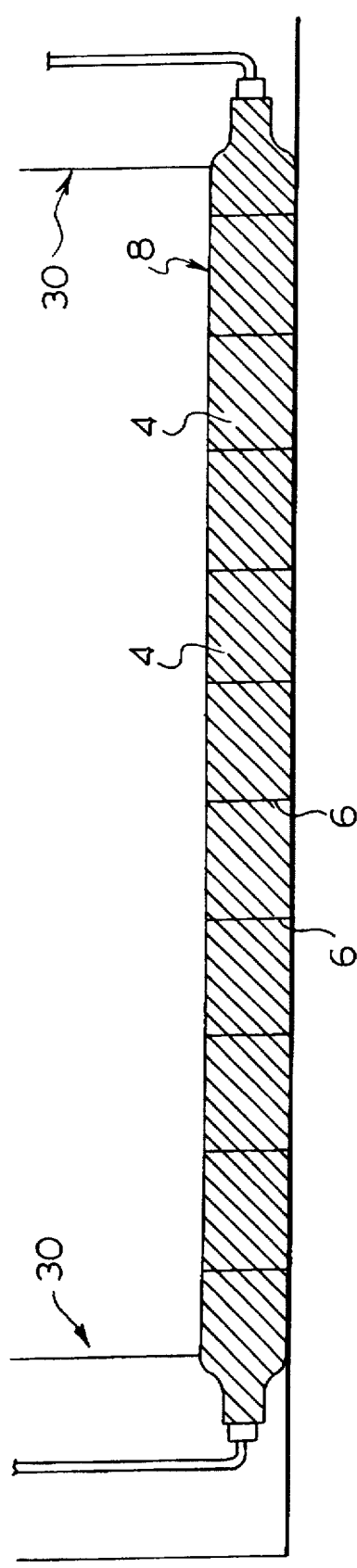
FIG. 2 is a view similar to FIG. 1 with the pipe liner expanded to conform to the interior walls of the pipeline.

The expanded liner is shown in FIG. 2.

It is believed the pressurizing and expanding of the liner is simplified due to the circular cross section, which tends to expand and increase the size of the liner uniformly. Furthermore, the liner is not initially in a distorted state, as would be the case with liners initially deformed into a 'U' shape.

Although the system has been shown in FIGS. 1 and 2 for relining a pipe segment between two manholes 30 with access provided by the manholes, the pipe segments could be longer and access to one end of the pipe could be through a trench. Again, the pipe segments would be joined to form a continuous liner and the joining can be by means of the various joints described. The actual pipe segments are preferably of a PVC material, but other suitable materials can be used. There are modified PVC materials with expansion additives and these materials can be used.

With PVC liners, heating in the range of 65° C. to 70° C. is desirable. This temperature range provides high expandability with less chance of localized failures due to blow outs. With higher temperatures, the expansion is less controllable and the properties of the plastic can change, making it more susceptible to damage or blow outs.

FIGS. 3, 4 and 5 show a further application where only a limited portion of the sewer needs to be relined. There is a damaged area 20 between two manholes and a segmented liner is positioned to repair the damaged area. Again, the liner is inflated and subjected to heat to effectively expand until limited by the existing walls of the sewer.

The actual thickness of the PVC liner can be selected to accommodate the needed expansion to fill the interior. In many cases, conventional PVC pipe is sufficient.

To ensure that the inflatable plugs remain in the same spatial relationship, the plugs are chained together and thus, cannot separate. Once the plugs are deflated, they can pass through the pipe liner, either in the original or in the expanded condition, whereafter the chain can be removed, if desired, or merely the whole assembly can be withdrawn from one end of the liner.

Figure 6:
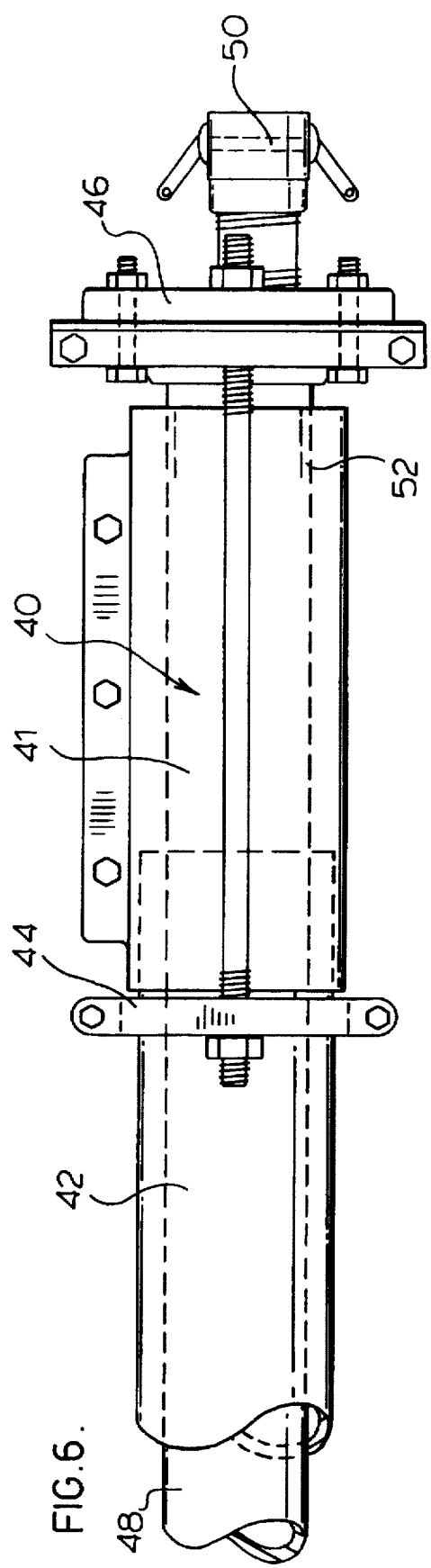
FIG. 6 illustrates a mandrel assembly used at the end of a pipeline.

Alternately, the mandrel assembly 40, shown in FIG. 6, engages and grips the end of the existing pipe 42 which is being relined. The mandrel assembly grips pipe 42 by the adjustable ring fastener 44. The opposite end of the mandrel has a restrained blind flange which closes the pipe liner 48. The hot pressurizing medium is introduced through coupling 50. A stiffening ring insert 52 is inserted in the end of the liner to avoid collapse thereof.

Figure 7:
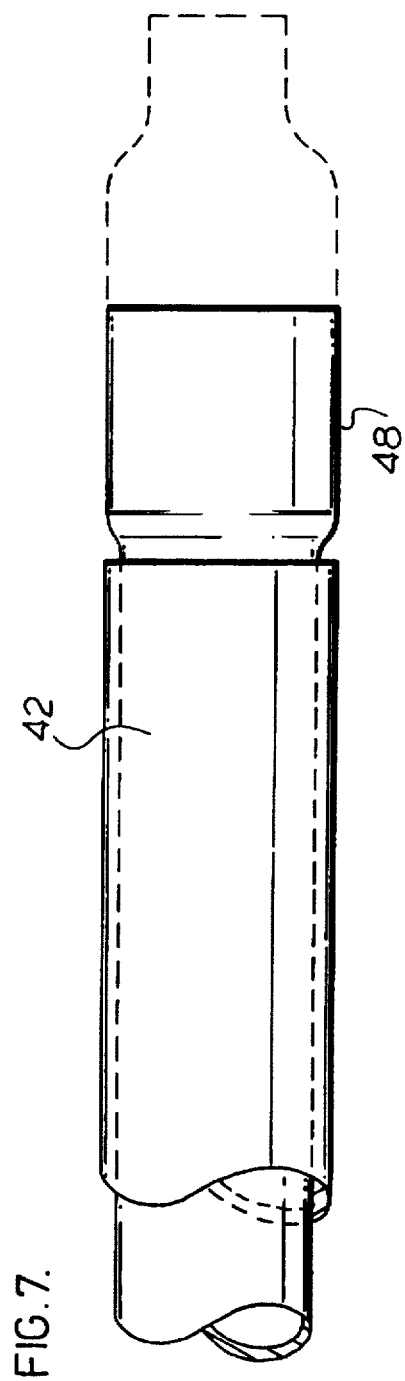
FIG. 7 shows the end of the pipeline with the mandrel removed.

As shown in FIG. 7, the sleeve 41 of the mandrel assembly 40 allows the liner to expand beyond the pipe end 42 to the diameter thereof. When the mandrel assembly is removed, the overexpanded end of the liner can be cut at an appropriate length for joining with standard fittings (see FIG. 7).

A further advantage of the present system is that the expanding process can be used to achieve different diameters of the final lined pipe. For example, at an end of a waterline, a sleeve can be used to form an extension equal to the outer diameter of the waterline. The liner, when expanded, contacts the inner walls of the pipe, but at the sleeve the liner continues to expand until restricted by the sleeve with a smooth transition in the liner therebetween. The sleeve can then be removed and the liner trimmed. In this way, the ends of the liner can be shaped to fit with valves or other connectors, etc. In some cases, a thicker section of pipe section is added to the liner to provide more material for the necessary expansion.

The method and apparatus can also be used for lining manholes. In this case, a large diameter liner is used which is preferably capped at one end. For example, a 24 inch liner can be located in a 48 inch manhole. The liner is then plugged at the upper end and expanded. The liner is expanded until it is restricted by the interior walls of the manhole. Any lines coming into the manhole are easily identified and the liner is cut to allow entry of these lines. With this system, the liner and the cap expand.

The actual material of the liner can be any suitable thermally expandable material and PVC or PVC with expansion additives have proven acceptable. The particular application, i.e. sewer, waterline, gas line or other fluid carrying line, may require care in selecting the most appropriate material of the liner. Any suitable joining method can be used for the particular application. For example sewer lines can use many types of joints, whereas for pressurized pipelines, fusion and solvent joints are better.

To assist in insertion of a liner, it can be warmed to provide more flexibility. Hot medium can be introduced to heat the liner and allow it to accommodate curves or gradual transitions.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of forming a pipe within an existing pipe of a given inside diameter comprising the steps of providing PVC pipe segments having an outside diameter sized to allow loose insertion into the existing pipe, joining a multiplicity of said pipe segments forming a series thereof and inserting the joined pipe segments into said existing pipe such that the joined pipe segments define a desired length of pipe loosely received within the existing pipe as said given inside diameter is much greater than said outside diameter of said pipe segments, sealing opposite ends of said joined pipe segments and heating said joined pipe segments under pressure to cause said pipe segments to soften and expand said pipe segments and joints therebetween outwardly until restricted by said existing pipe with the integrity of said joints being maintained, cooling said joined pipe segments and removing the seals from said opposite ends to expose a new pipe with an outside surface thereof in contact with said inside diameter of said existing pipe with said new pipe inherently maintaining its expanded size.

2. A method as claimed in claim 1 wherein said existing pipe has diameter at least of eight inches.

3. A method as claimed in claim 1 wherein said existing pipe is a sewer manhole and said pipe segments are of a diameter of about 24 inches prior to expanding in the existing manhole.

4. A method as claimed in claim 1 wherein said pipe segments are joined using a fusion joint technique.

5. A method as claimed in claim 1 wherein said pipe segments are joined using a solvent joint technique.

6. A method as claimed in claim 1 wherein said pipe segments are joined using overlapping locking mechanical joints formed as part of the pipe segments.

7. A method as claimed in claim 1 whereby said method is used to reline part of a pipeline.

8. A method as claimed in claim 1 wherein said method is used to reline part of a sewer line.

9. A method as claimed in claim 1 wherein said method is used to reline a manhole.

10. A method as claimed in claim 1 wherein said joined pipe segments are heated to a temperature between 60° and 70° C. as part of the expanding step.

* * * * *